United States Patent [19]

Nakanishi

[11] Patent Number: 5,011,393
[45] Date of Patent: Apr. 30, 1991

[54] APPARATUS FOR MANUFACTURING SILICONE GEL SHEET

[75] Inventor: Motoyasu Nakanishi, Fujishi, Japan

[73] Assignee: Kabushiki Kaisha Cubic Engineering, Shimizushi, Japan

[21] Appl. No.: 262,878

[22] Filed: Oct. 26, 1988

Related U.S. Application Data

[62] Division of Ser. No. 73,067, Jul. 13, 1987, Pat. No. 4,950,148.

[30] Foreign Application Priority Data

Jan. 31, 1987 [JP] Japan .................................. 62-21254

[51] Int. Cl.⁵ ............................................. B28B 7/36
[52] U.S. Cl. ........................................ 425/89; 425/90;
425/91; 425/92; 425/96; 425/99; 425/101;
425/113; 425/114; 425/116; 425/117; 425/122;
425/127
[58] Field of Search ...................... 425/4 C, 89, 90, 91,
425/92, 96, 99, 101, 113, 114, 117, 122, 116,
147, 127, 371, 344, 406, 220, 224, 225, 223, 325,
354; 264/101, 102, 213, 216, 217, 352, 310;
150/246, 247, 231, 328

[56] References Cited

U.S. PATENT DOCUMENTS

| | | | |
|---|---|---|---|
| 3,630,802 | 12/1971 | Dettling | 156/246 |
| 3,933,548 | 1/1976 | Anderson, Jr. et al. | 156/246 |
| 4,003,777 | 1/1977 | Eddy | 156/324 |
| 4,128,369 | 12/1978 | Kemerer et al. | 425/394 |
| 4,295,907 | 10/1981 | Cordts et al. | 264/216 |
| 4,693,858 | 9/1987 | Volke | 264/102 |
| 4,698,110 | 10/1987 | Vassiliou | 156/231 |

*Primary Examiner*—John J. Gallagher
*Attorney, Agent, or Firm*—Wenderoth, Lind & Ponack

[57] ABSTRACT

An apparatus for manufacturing a silicone gel material has a pair of tanks for separately storing and kneading first and second liquids gel forming materials, a feeder feeding the liquids while kneading them, a debubbling unit with a debubbling tank for removing air bubbles contained in the materials from the feeder and turning the tank upside down to discharge into a hopper, a nozzle for discharging silicone gel material received from the hopper in a predetermined thickness onto a lower film moving below the nozzle, an upper film supplier placing an upper film onto the film of silicone gel material, upper and lower rollers rolling the upper and lower films and the film of silicone gel material into a laminated strip, a belt conveyor receiving the laminated strip, a heating tunnel for gelling the silicone gel material and a strip take up device at the exit of the heating tunnel.

7 Claims, 3 Drawing Sheets

APPARATUS FOR MANUFACTURING SILICONE GEL SHEET

This is a divisional application of Ser. No. 07/073,067, filed July 13, 1987, now U.S. Pat. No. 4,950,148.

BACKGROUND OF THE INVENTION

The present invention relates to an apparatus to be used to manufacture thin sheet material including silicone gel material.

Silicone gel is an extremely useful material as a buffer material or a shock absorbing material. Silicone gel to be used for such application has, in most cases, a penetration value of approximately 50 to 200 measured according to JIS (Japanese Industrial Standard) K 2530-1976 -(50 g load) and a small thickness.

In the conventional method for manufacturing a thin silicone gel sheet material as described above, silicone material such as, for example, Toray Silicone CY52 (trademark) (manufactured by Toray Silicone Kabushiki Kaisha) has been kneaded, transferred into a tray type container, uniformly leveled with a hand held spatula type plate, and heated with a flat holding plate made of metal or glass placed on the silicone material in the tray type container.

However, said kneaded silicone gel material has the property that it has a viscosity of 1000 to 1200CP when it does not contain other substances and 5000 to 10,000CP when it is kneaded with fine hollow particles and the pot life at a normal temperature is short and therefore there has been a problem that the work of filling the tray type container with this silicone material and leveling it in the container has been extremely troublesome and unsuitable for volume production.

SUMMARY OF THE INVENTION

An object of the present invention is to provide an apparatus capable of automatically processing silicone gel material with high viscosity without manual operation and thus manufacturing a silicone gel sheet with the specified thickness.

To achieve this object, the apparatus in accordance with the present invention is provided with a device having a material supplying means for supplying kneaded silicone gel material such as, for example, a storing means such as a hopper into which the material is charged and a pressurized feeding means for feeding under pressure silicone gel material taken out from the hopper, a nozzle for discharging silicone gel material supplied from said material supplying means such as, for example, a nozzle having a narrow and long discharging port which is connected to said pressurized feeding means and horizontally open to discharge silicone gel material fed under pressure from said pressurized feeding means in the specified thickness and width, at least one movable receiving means which receives the sheet-formed strip made of silicone gel material discharged from said nozzle and moves while keeping pace with the discharging speed of the sheet-formed strip such as, for example, a tray type container provided on the belt conveyor, and a heating section for heating the sheet-formed strip on said movable receiving means and said apparatus is adapted so that the sheet-formed strip made of silicone gel material which is discharged from said nozzle is extended over the movable receiving means along with movement of said movable receiving means and heated by the heating section to gel the silicone gel material in the form of a sheet.

Another object of the present invention is to provide an apparatus which is adapted so that the thin sheet-formed strip supplied to the movable receiving means is completely free from bubbles.

If silicone gel material for forming the sheet-formed strip contains bubbles, large bubbles will be included in the finished silicone gel sheet and the uniform shock absorbing performance of the finished sheet will be impaired or the finished silicone gel sheet will be partly damaged.

In case of the apparatus in accordance with the present invention, such problem is eliminated by sealing the tank which contains silicone gel material and reducing the internal pressure of the tank to remove bubbles from silicone gel material in the material supplying means, for example, immediately before it is fed into the hopper.

Another further object of the present invention is to provide an apparatus for laminating both sides of the sheet-formed strip supplied from the nozzle to the movable receiving means, that is, the thin silicone gel material, with heat-resistant films on both sides and rolling this laminated thin sheet-formed strip covered with films on both sides by the rollers before heat treatment. Thus, the silicone gel sheet can be formed in a uniform thickness.

These upper and lower films should preferably be easily removable from silicone so that they can be replaced with other types of films such as, for example, thermoplastic film, depending on the purpose or use of the silicone gel sheet.

PREFERRED EMBODIMENT OF THE INVENTION

Figure 1:
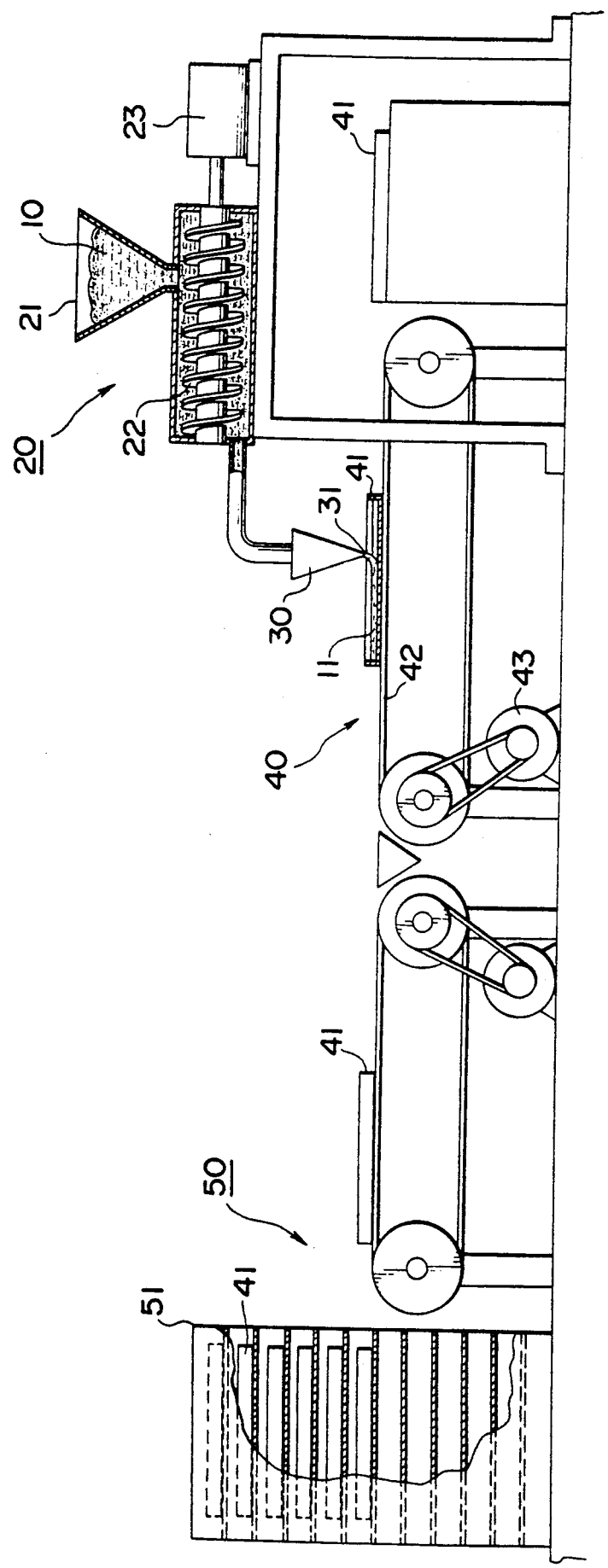
FIG. 1 is a partly cutaway side view illustrating the construction of the apparatus in accordance with the present invention.

Referring to FIG. 1 which is a partly cutaway side view illustrating the construction of the apparatus in accordance with the present invention, there is shown the material supplying means 20 which supplies silicone gel material 10. This means 20 is provided with the hopper 21 which is the storing means and the screw conveyor 22 shown as the pressurized feeding means. This screw conveyor 22 is connected to the nozzle 30 to which silicone gel material 10 is supplied from the screw conveyor 22. The transfer unit 40, including belt conveyor 42, and the heating section combined with this transfer unit 40 are shown below said nozzle 30.

Said hopper 21 can be otherwise constructed so long as it can store silicone gel material 10. In the embodiment, the hopper is flared and opened upwardly to admit kneaded silicone gel material, which is supplied to the screw conveyor 22 at a lower position by its own weight.

The screw conveyor 22 supplies under the specified pressure silicone gel material 10 supplied from the hopper 21 to the nozzle 30 and silicone gel material 10 is extruded from the nozzle 30 by virtue of this pressure.

The material supplying pressure and speed of the screw conveyor 22 are set by the variable speed drive motor 23.

The discharging port 31 of said nozzle 30 has a narrow and long opening just above the movable receiving means 41 provided on said transfer unit 40, which opening extends in the direction of the width of the conveyor belt 42, that is, the direction perpendicular to the plane of the drawing. The size in the direction of right angles to that width, that is, the direction along the conveyor in FIG. 1, can be freely set by, for example, replacing the nozzle tip, to change the thickness of the layer of silicone gel material 10.

Silicone gel material 10 discharged from this discharging port 31 is formed in a layer on the movable receiving means 41 as a thin sheet-formed strip 11 which has the thickness determined by the size of the discharging port 31.

Said movable receiving means 41 in the embodiment as shown is formed by the tray type container which is removably provided on the belt conveyor 42. However, depending on the situation, the upper surface of the belt conveyor 42 can be made of steel to directly serve as the movable receiving means.

Said movable receiving means 41 is arranged so that the direction of its width, that is, the direction orthogonally intersecting the forwarding direction, matches the direction of width of the discharging port 31 of said nozzle 30 and accordingly the sheet-formed strip 11 made of silicone gel material 10 which is discharged from the nozzle 30 is loaded on the movable receiving means 41 which moves in the same direction as the discharging direction and the material is extended on the movable receiving means 41 which moves at a speed corresponding to the discharging speed of silicone gel material 10.

Said movable receiving means 41 is driven by the variable speed drive 43 which is controlled in relation to the drive motor 23 for said screw conveyor 22.

Said heating section 50 in said embodiment is equipped with a multi-staged heating furnace 51 which is constructed so that, for example, a number of tray type containers 41 can be stacked therein to separately heat the tray contains unloaded from the belt conveyor 42. If the upper surface of the belt conveyor 42 is directly used as the movable receiving means as described above, a heating section through which the belt conveyor 42 passes during running is provided and a means for taking up gelled silicone gel sheet after heat treatment is provided following said heating section.

Figure 2:
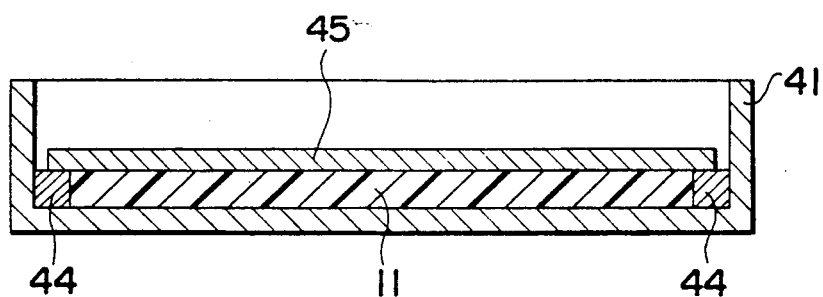
FIG. 2 is a vertical front view of the tray type container as the movable receiving means for use in the embodiment shown in FIG. 1.

The thickness and the width of said silicone gel sheet can be freely set by replacing the discharging tip of said nozzle 30 or forming the nozzle 30 itself so that the opening width and thickness of the discharging port 31 can be adjusted. For more strictly setting the thickness of the silicone gel sheet, liners 44 and 44' with a specified thickness can be provided at both sides of the tray type movable receiving means 41 as shown in FIG. 2 to confine the sheet-formed strip 11 made of silicone gel material between these liners 44 and 44' and a smooth flat holding plate 45 can be placed on this sheet-formed strip 11 to make the thickness of sheet-formed strip 11 uniform due just to the weight thereof or by applying a certain specified pressure thereto with a separate means.

It is preferable to apply in advance a parting agent such as, for example, a silicone oil (tradename: SH-3749) which is manufactured by Toray Silicone Kabushiki Kaisha, for avoiding adhesion of silicone gel material 10 to said movable receiving means 41 and said holding plate 45. Thus, the gelled silicone gel sheet can be easily separated from the movable receiving means 41.

Figure 3:
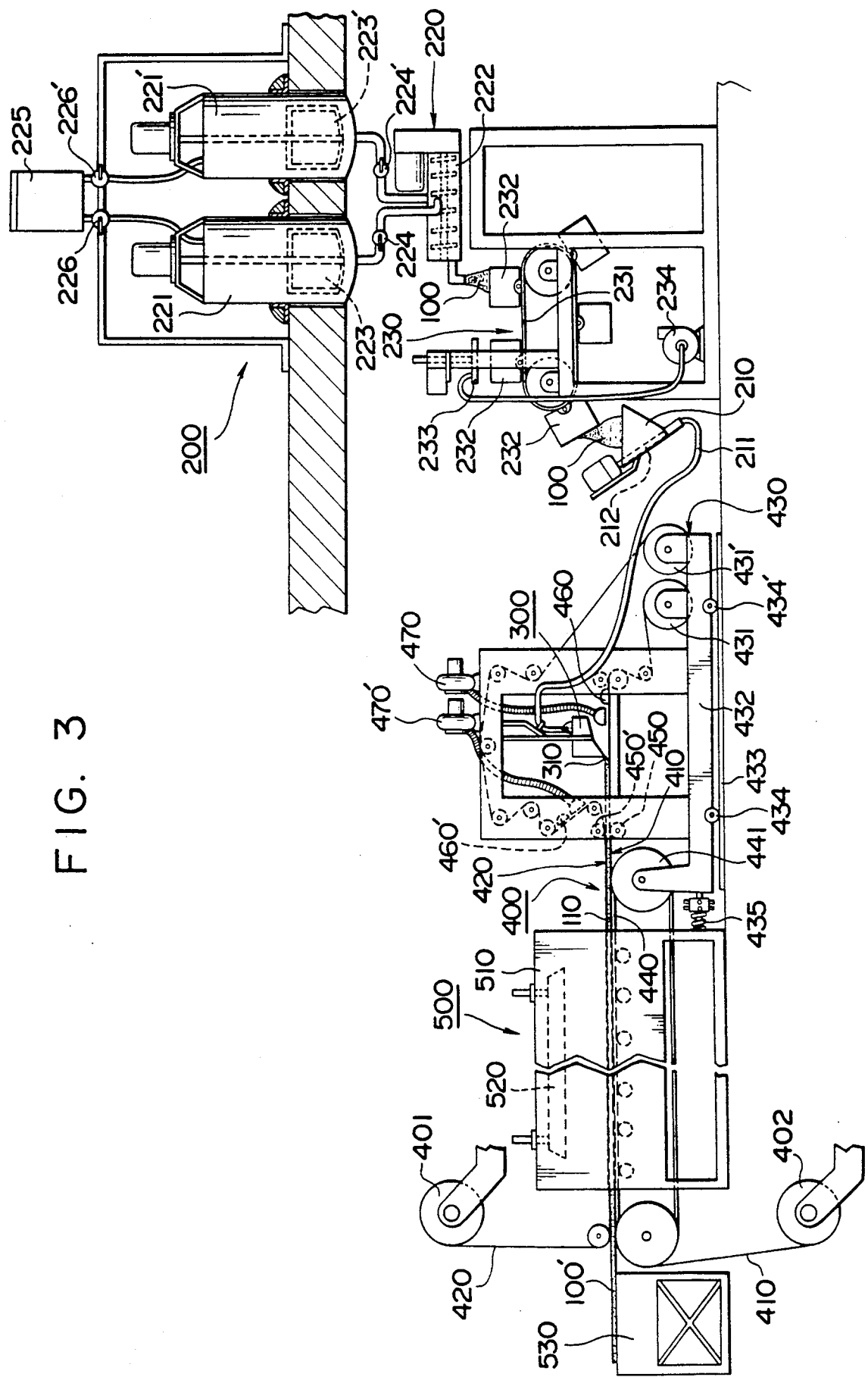
FIG. 3 is a partially sectional side view showing another embodiment of the apparatus in accordance with the present invention.

Referring to FIG. 3, there is shown another embodiment of the apparatus in accordance with the present invention.

In this embodiment, bubbles are removed from silicone gel material 100 in the material supplying means before it is supplied to the hopper and the sheet-formed strip 110 made of silicone gel material is rolled by a pair of upper and lower rollers.

In addition, in this embodiment, the sheet-formed strip made of silicone gel material is laminated with films on both sides and the lower film is placed on the belt conveyor as the movable receiving means.

In this embodiment, a silicone material made up by mixing fine hollow particles such as, for example, FIL-LITE (trademark) or EXPANCEL (trademark) hollow particles of silicone material manufactured by Nippon Fillite Kabushiki Kaisha in a two-liquid kneaded type silicone material such as, for example, TORAY SILICONE CF5027 (trademark) or TORAY SILICONE CY52, a two-liquid kneaded type silicone material manufactured by Toray Silicone Kabushiki Kaisha or KE-1051 (trademark) two-liquid kneaded type silicone material manufactured by Shinetsu Kagaku Kogyo Kabushiki Kaisha is used as silicone gel material. Such silicone gel is disclosed in the U.S. patent application Ser. No. 814,726.

The apparatus of this embodiment comprises a material supplying means 200, nozzle 300, transfer unit 400 and heating section 500. Said material supplying means 200 is provided with the hopper 210, kneading unit 220 for kneading and treating silicone gel material 100 and bubble removing unit 230 following the kneading unit 220.

Said kneading unit 220 has a pair of kneading tanks 221 and 221' for separately storing liquids A and B and the kneading feeder 222 such as the kneader pump which is provided below the kneading tanks 221 and 221'.

Liquids A and B for combining into silicone gel material 100 are respectively mixed with said fine hollow particles in individual tanks 221 and 221'.

For this purpose, rotary vanes 223 and 223' are respectively provided inside the tanks 221 and 221' to individually stir liquid A and liquid B to mix it with fine hollow particles.

Tanks 221 and 221' are respectively provided with valves 224 and 224', which are opened to supply liquids A and B to the feeder 222. In other words, the gelling phenomenon during kneading can be prevented by mixing fine hollow particles in liquids A and B in different tanks 221 and 221'.

These tanks 221 and 221' are installed on the upper floor of the plant and utilize gravity as a supplementary force for pressurized supplying of liquids A and B to the feeder 222 located on the lower floor.

For mixing said fine hollow particles, kneading tanks 221 and 221' are provided with the tank 225 for supplying fine hollow particles from which a required quantity of fine hollow particles is supplied to the pair of kneading tanks 221 and 221' through valves 226 and 226', respectively.

The feeder 222 kneads liquids A and B which have been mixed with fine hollow particles into a gelled solidifiable state and feeds it to the bubble removing unit 230 which removes air bubbles from the material 100.

This debubbling unit 230 has an endless belt 231 which circulates in a vertical direction and is equipped with a plurality of bubble removing tanks 232 which intermittently move along with the endless belt 231 and stop in sequence at a position where silicone gel material 100 is supplied from the feeder 222, a bubble removing position and a position where silicone gel material 100 is supplied to the hopper 210. At the bubble position for this tank 232 is provided a cover 233 which lowers from an upper position to close the opening of the tank 232 when the tank 232 is stopped. The cover 233 is provided with the pressure reducing means such as, for example, a vacuum pump 234 etc. to reduce the internal pressure in the tank 232 tightly closed by the cover 233.

Accordingly, air bubbles entrained in the silicone gel material 100 in the tank 232 during the kneading process are removed by reduction of the internal pressure in the tank 232.

The tank 232 turns down to a position above the hopper 210 after air bubbles have been removed and stops at this position with its opening faced down.

Accordingly silicone gel material 100 in the tank 232 flows out from the tank 232 into the hopper 210.

At the outlet side of the hopper 210 is provided the pressurized feeding means 212 such as, for example, a screw for feeding silicone gel material 100 under pressure whereby silicone gel material 100 is pushed out by this pressurized feeding means 212 into the material supplying passage. Said passage, for example, a flexible hose 211, preferably a transparent hose made of polyvinyl chloride, is connected between the output of the hopper 210 and the nozzle 300 nd this flexible hose 211 is freely reconnectable to the hopper for cleaning after the work has been finished.

The pressurized feeding screw 212 is provided inside the hopper 210 and silicone gel material 100 in the hopper 210 is pushed out toward the nozzle 300.

If, for example, bubble removal is carried out inside the kneading tanks 221 and 221', the hopper 210 can be omitted from the material supplying means 200 since the kneading feeder 222 can be directly connected to the nozzle 300 to supply silicone gel material 100 to the nozzle 300.

The sheet-formed strip 110 discharged from this nozzle 300 is laminated between films 410 and 420 on both sides immediately after it has been discharged.

This nozzle 300 is made so that silicone gel material 100 inside the nozzle is discharged by its own weight and, in this embodiment, accordingly a screw conveyor as a pressurized feeding means is not employed.

The transfer unit 400 is provided with the film supplying unit 430 and a pair of reels 431 and 431' of this film supplying unit 430 have wound thereon the upper film 420 and the lower film 410 serving as the movable receiving means. The lower film 410 moves horizontally below the discharging port 310 so that the lower film 410 receives the sheet-formed strip 110 and the upper film 420 is supplied from a position above the discharging port 310 so that the upper film 420 is laminated onto the upper surface of the sheet-formed strip 110.

The sheet-formed strip 110 thus covered with films 410 and 420 on both sides is horizontally transferred by the carrying means such as, for example, the belt conveyor 440 etc. and guided to the heating section 500.

The sheet-formed strip 110 is rolled to the specified thickness by a pair of upper and lower rollers 450 and 450' before it reaches the heating section 500 during transportation. Though the rollers 450 and 450' also serve as the feeding rollers in this embodiment, the embodiment is not restricted to this construction.

Said films 410 and 420 are preferably such that they can be removed when the sheet-formed strip 110 is taken out as the finished silicone gel sheet. Thus, films 410 and 420 can be removed from the finished silicone gel sheet and covering films suitable for the use of the silicone gel sheet can be instead laminated onto the silicone gel sheet.

In the embodiment, a pair of recovery wind-up reels 401 and 402 which are driven by means (not shown) are provided at the end part of the heating section 500 to remove and take up films 410 and 420 from the sheet-formed strip 110, and these reels 401 and 402 may be used as the supplying side reels 431 and 431'.

To ensure easy removal of films 410 and 420 from the silicone gel sheet, a parting agent is applied to films 410 and 420 by an applying means such as, for example, felt brushes 460 and 460' before the films are laminated onto the sheet-formed strip 110 and the parting agent is dried by the fans 470 and 470' after it has been applied.

The sheet-formed strip 110 rolled by the rollers 450 and 450' is guided into the heating tunnel 510 of the heating section 500 by the belt conveyor 440. Inside this heating tunnel 510 is provided a heating means such as, for example, a far infrared heater 520 and the gelling of the sheet-formed strip 110 is completed while it passes through this heating tunnel 510.

Said belt conveyor 440 is provided at the heating section side of the rollers 450 and 450' in this embodiment.

The roll 441 at the starting end of this belt conveyor 440 is supported by the framework 432 of said film supplying unit 430 and the framework 432 is loaded on the rail 433 on wheels 434 and 434'.

Said framework 432 is urged by the spring mechanism 435 away from said heating tunnel 510 as the fulcrum and the belt conveyor 440 is thus tensioned by the repulsive force of this spring.

The silicone gel sheet 100' whose gelling has been completed is taken up at the taking-up section 530 located at the end of the heating tunnel 510. However, the silicone gel sheet cannot be actually used in the form in which it is taken up and generally it is sealed into a covering member such as a covering film, and it is used as a so-called "gel-filled pad".

If said upper and lower films 410 and 420 are suitable as the covering material for an application environment where a gel-filled pad is to be used, the films 410 and 420 can be adhered to make the gel-filled pad. However, since the application environment where the gel-filled pad is used varies, film 410 and 420 which are inexpensive, non-massive and heat resistant should be used when manufacturing the silicone gel sheet and another type of covering material which is suitable for the application environment should replace films 410 and 420 for use on the finished silicone gel sheet 100'.

For example, an extremely thin polyester film is suitable for films 410 and 420 when manufacturing the silicone gel sheet, and polyvinyl chloride film, polyurethane film or a copolymerized film of polyurethane and polyvinyl chloride is favorable as a covering material for the finished product gel-filled pad.

For replacing the films, a continuous silicone gel sheet 100' with films 410 and 420 thereon can be cut in appropriate sizes, the films applied to the upper and lower sides of the cut silicone gel sheets removed and films suitable for the application environment adhered to the upper and lower surfaces of the silicone gel sheet as the covering material.

Figure 4:
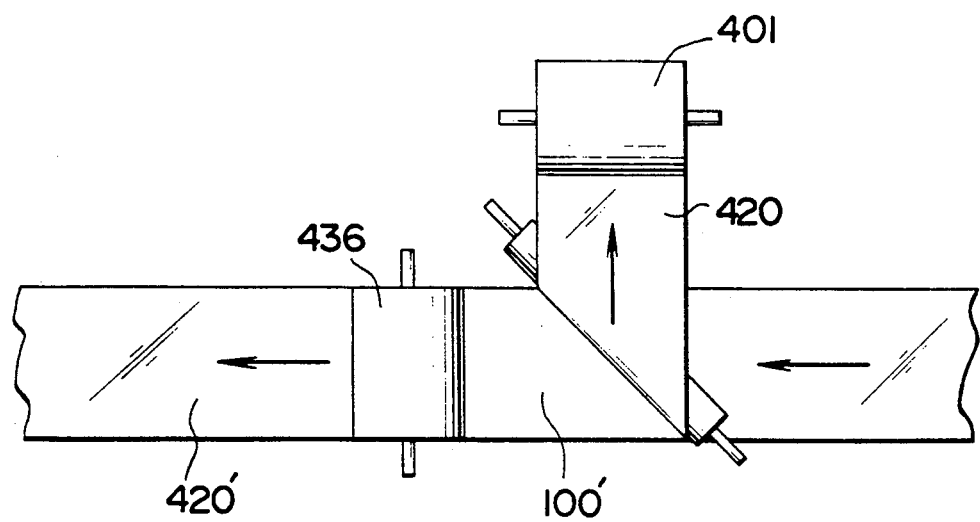
FIG. 4 is a plan view showing an embodiment of the film replacing mechanism to be used in the apparatus shown in FIG. 3.

If the films are replaced on the continuous silicone gel sheet, the films 410 and 420 can be wound up by the wind-up reels 410 and 402 to remove them from the silicone gel sheet 100' and as shown in FIG. 4, new covering films 420' (one of which is not shown) unwound from the film supplying reel 436 can be immediately adhered onto the upper and lower surface of the silicone gel sheet 100'.

The present invention is not limited to the above-described embodiment and is available in various variations within the range of the claims and spirit of the present invention.

What is claimed is:

1. An apparatus for manufacturing a silicone gel material, comprising:
    a material supply means having:
        a pair of tanks for separately storing and kneading first and second liquids which are used to prepare silicone gel material,
        a feeder connected to said pair of tanks for feeding two kinds of liquids supplied from said tanks while kneading the liquids,
        a debubbling unit connected to said feeder which has at least one debubbling tank for storing silicone gel material supplied from said feeder, means for removing air bubbles contained in silicone gel material in said tank by temporarily sealing said tank at a debubbling position and reducing the pressure within the tank, and means for causing silicone gel material in the tank to flow out of the tank by turning the tank upside down, and
        a hopper provided at a position beneath the tank of said debubbling unit where said tank is turned upside down;
    a nozzle connected to said hopper for receiving silicone gel material from said hopper and having a narrow and long discharge port which is horizontally elongated for discharging silicone gel material in a predetermined thickness;
    a transfer unit having:
        a lower film supplying means for supplying a lower film to move in a direction and below said discharge port of said nozzle to receive a film of silicone gel material thereon,
        an upper film supplying means for supplying an upper film onto said film of silicone gel material at a point spaced from said discharge port of said nozzle in the direction of movement of said lower film,
        upper and lower rollers spaced from said point in the direction of movement of said lower film and engaging the upper and lower films respectively for rolling the said upper and lower films and said film of silicone gel material into a laminated strip, and
        a belt conveyor spaced from said rollers in the direction of movement of said lower film for receiving said laminated strip at a specified speed; and
    a heating section having:
        a heating tunnel through which said belt conveyor extends from an entrance to an exit and including heating means for gelling the silicone gel material of the laminated strip, and
        strip taking up means provided at the exit of said heating tunnel.

2. An apparatus as claimed in claim 1 wherein said hopper has an outlet and has a pressurized feeding means at said outlet.

3. An apparatus as claimed in claim 1 wherein said transfer unit further has a parting agent applying means for applying a parting agent to the surfaces of each of said films which come in contact with said silicone gel material before said upper and lower films come in contact with said silicone gel material.

4. An apparatus as claimed in claim 3 wherein said parting agent applying means has a drying means for drying the parting agent applied to said film surfaces.

5. An apparatus as claimed in claim 1 wherein said taking-up means is provided with a means for removing upper and lower films from said silicone gel material and a means for laminating a further film onto the upper and lower surfaces of said silicone gel material.

6. An apparatus as claimed in claim 1 wherein the discharge port of said nozzle has a dimension in the direction of movement of said lower film which is variable, so that the thickness of the silicone gel material can be varied.

7. An apparatus as claimed in claim 1 further comprising a further tank connected to said pair of tanks for supplying fine hollow particles to said pair of tanks.

* * * * *